United States Patent
Säilä

(10) Patent No.: US 8,725,223 B2
(45) Date of Patent: May 13, 2014

(54) APPARATUS FOR A PORTABLE ELECTRONIC DEVICE

(75) Inventor: Sami Ilmari Säilä, Halikko (FI)

(73) Assignee: Nokia Corporation, Espoo (FI)

( * ) Notice: Subject to any disclaimer, the term of this patent is extended or adjusted under 35 U.S.C. 154(b) by 334 days.

(21) Appl. No.: 12/702,183

(22) Filed: Feb. 8, 2010

(65) Prior Publication Data

US 2011/0194232 A1  Aug. 11, 2011

(51) Int. Cl.
*H04M 1/00*  (2006.01)
(52) U.S. Cl.
USPC .................................. 455/575.4; 455/550.1
(58) Field of Classification Search
USPC .................................................. 455/575.4
See application file for complete search history.

(56) References Cited

U.S. PATENT DOCUMENTS

| | | | |
|---|---|---|---|
| 6,208,874 B1 * | 3/2001 | Rudisill et al. | 455/575.4 |
| 2002/0039074 A1 * | 4/2002 | England | 341/22 |
| 2002/0077161 A1 | 6/2002 | Eromaki | |
| 2002/0154475 A1 | 10/2002 | Lammintaus et al. | |
| 2003/0090468 A1 | 5/2003 | Finke-Anlauff | |
| 2005/0064921 A1 * | 3/2005 | Jeong et al. | 455/575.4 |
| 2006/0293094 A1 * | 12/2006 | Kilpi et al. | 455/575.3 |
| 2007/0082695 A1 * | 4/2007 | Yoon et al. | 455/550.1 |
| 2007/0259702 A1 | 11/2007 | Kemppinen | |
| 2008/0119248 A1 * | 5/2008 | Nissen et al. | 455/575.4 |
| 2009/0162579 A1 * | 6/2009 | McDuff | 428/17 |
| 2010/0118475 A1 * | 5/2010 | Lee et al. | 361/679.01 |

FOREIGN PATENT DOCUMENTS

| | | |
|---|---|---|
| EP | 1312999 A2 | 5/2003 |
| EP | 1773031 A1 | 4/2007 |
| EP | 1916826 A1 | 4/2008 |
| WO | WO-02/063789 A1 | 8/2002 |
| WO | WO-2008/056019 | 5/2008 |
| WO | WO-2009/080869 | 7/2009 |
| WO | 2084887 | 8/2009 |

OTHER PUBLICATIONS

International Search Report and Written Opinion for PCT No. PCT/FI2011/050031, dated Jun. 13, 2011.

* cited by examiner

*Primary Examiner* — Lester Kincaid
*Assistant Examiner* — Andy Gu
(74) *Attorney, Agent, or Firm* — Harrington & Smith (57) ABSTRACT

An apparatus comprising a first and second housing is described. The apparatus is configured to enable the sliding motion of a first housing with respect to a second housing from a first configuration to a second configuration via complementary sliding connectors on each of the first and second housings. In the second configuration the complementary sliding connectors are not connected allowing rotation of the second housing with respect to the first housing to a third configuration.

22 Claims, 9 Drawing Sheets

APPARATUS FOR A PORTABLE
ELECTRONIC DEVICE

TECHNICAL FIELD

The present disclosure relates to the field of portable electronic devices which have at least two housings which are slidable/rotatable with respect to each other, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

At present many portable electronic devices, such as personal digital assistants (PDA) or mobile phones are designed as one-housing structures. Some have been designed as two-housing structures. Two-housing structures have been designed to allow various configurations of the two housings. By moving between the different configurations different faces or regions of the housings may be exposed or concealed. Screens and displays may be concealed in one configuration and exposed in a different configuration. Previous designs may be limited in the number of configurations available. Previous designs may not maximise the use of the surface area of the housings as some of the surface area may be concealed or difficult to access in available configurations.

SUMMARY

In a first aspect, there is provided an apparatus for a portable electronic device, the apparatus comprising a first housing and a second housing with complementary sliding connectors, wherein the complementary sliding connectors are configured to be engaged along a sliding connection axis such that the first and second housings can be slid with respect to one another between a first configuration and a second configuration along a plane parallel to the sliding connection axis, and wherein the complementary sliding connectors are configured to be disengaged in the second configuration and be rotated about a rotation axis to allow for relative rotation of the first and second housings away from the sliding plane to provide a third configuration.

The first and second housings may comprise major faces which may or may not comprise functional apparatus. Functional apparatus may include one or more combinations of keyboards, switches, screens, buttons, scanners, cameras, ports or other systems with which a user interacts with the device (i.e. user interface elements). Major faces, which are faces with a large surface area compared to other faces, may preferably be used for large electronic apparatus such as screens or keyboards. A lateral side may be positioned to the side of a major face of a housing.

In the first configuration the sliding connectors may be engaged, allowing motion along a sliding axis. From the first configuration, the second housing may be slid, with respect to the first housing, to a second configuration. In the second configuration the sliding connectors may be disengaged, thus allowing the second housing to move with respect to the first housing in directions not aligned with the sliding axis. In configurations between the first and second configurations the sliding connectors may prevent motion of the second housing, with respect to the first housing, away from the sliding connection axis.

When the apparatus is in the second configuration the second housing may be rotated, with respect to the first housing, into a third configuration. Third configurations may include configurations wherein the second housing has rotated through a range of angles with respect to the first housing. The rotation axis is the axis about which the second housing can be rotated with respect to the first housing.

The angle, θ, through which the second housing rotates, with respect to the first housing, from the second configuration to a third configuration for an embodiment may lie in the range $0 < \theta \leq \theta_{max}$. In some embodiments the upper limit on the angle though which the second housing rotates, $\theta_{max}$, may be determined by shaping the first or second housings. Some embodiments may permit $\theta_{max}$ to be up to and including 180°. This may allow a face of the second housing to overlie a face of the first housing in a third configuration. It will be appreciated that when θ=0° the apparatus is in the second configuration.

Advantages of an embodiment may include that the second housing may only be attached at one end or side to the first housing. This may reduce the space required for connectors and allow more space on the device to be used for functional apparatus, such as displays, keyboards or other user interfaces. As embodiments may comprise fewer physical connections than the prior art it may be more readily assembled. It may more readily allow the combination of different complementary housings.

Prior art discloses different kinds of configurable apparatus, but this disclosure describes apparatus which may be used as a slider phone and includes features of clam shell phones with fully adjustable lid part.

Embodiments may allow the second housing to slide to, or close to, the end of the first housing. It also may allow the faces covered in the first configuration to be largely or completely exposed in the second or third configurations. This allows the area used for functional apparatus to be maximised. In other embodiments in which the second housing is not configured to slide to the end of the first housing in the second configuration, the first housing may have a face (or partial face) exposed in the first configuration, which is then concealed as the apparatus is configured to be in the second configuration. This face (or partial face) is then exposed when the second housing is rotated to a third configuration.

An embodiment may comprise a rotating member configured to allow rotation of the second housing with respect to the first housing in the second and third configurations. The rotating member may comprise, for example, a barrel hinge or a pivot hinge. The rotating member may be configured to prevent all motion of the second housing with respect to the first housing in the third configuration, other than rotation about a rotation axis. The rotation axis may or may not be configured to be perpendicular to the sliding axis. The apparatus may be configured such that when the apparatus is in the second configuration the second housing may move with respect to the first housing only along the sliding axis or about the rotation axis.

In an embodiment the rotating member may be configured to slide along the female complementary sliding connector. In another embodiment the rotating member may be configured to slide along an axis which is parallel to the sliding connector axis.

An embodiment may have a rotating member located substantially at one end of the first or second housings. Another embodiment may have two rotating members located substantially at opposing sides of the same end of the first or second housings.

The rotating member may provide resistance to rotation in the third configuration. This resistance may enable the device to be stable in a range of third configurations with differing θ-angles. The rotating member may provide a force which varies as a function of θ in the third configuration resulting in certain preferred third configurations wherein the device is more stable. It will be appreciated that resistance could also be provided by, for example, the use of a magnet or electromagnet.

The female channel corresponding to the rotating member may limit the sliding of the first housing with respect to the second housing from the first configuration to the second configuration. The function of limiting the extent of sliding between the first and second configurations may be carried out by a limiting member distinct from the rotating member and sliding connectors.

The housings of an embodiment may comprise guide rails. A protruding guide rail on one of the housings and a complementary guide rail on the other housing could be configured to allow/limit motion of the second housing with respect to the first housing along the sliding connection axis. These guide rails may mitigate a shearing force being concentrated on the sliding connectors if, for example, when the housings are configured to be between the first and second configurations, a force is exerted on the housings not along the sliding connection axis. The guide rails may be configured to prevent motion of the first housing with respect to the second housing along an axis which is not parallel to the sliding connection axis when the apparatus is in a first configuration.

In order to provide electrical and data connection (it will be appreciated that the data connection may include one or more of optical, inductive, radio and infrared connections or support the use of RFID technology) between the first and second housings a cable between the first housing and the second housing may be connected via the rotating member, possibly through the centre of the rotating member. This cable may provide electrical connection between electronics in the first housing and electronics in the second housing. The electrical connection could also be used, for example, to connect a photocell housed on one housing and battery housed in the other housing. In other embodiments electrical communication between the first and second housing may be facilitated by electrical contacts. Electrical contacts may be placed on the sliding connectors, on the rotating member and/or elsewhere on the housings. Electrical and data connections between the first housing and second housings may be provided in only in a limited number of configurations.

An embodiment may include an apparatus for a portable electronic device, the apparatus comprising a first means for housing and a second means for housing with complementary means for sliding connection, wherein the complementary means for sliding connection are configured to be engaged along a sliding connection axis such that the first and second means for housings can be slid with respect to one another between a first configuration and a second configuration along a plane parallel to the sliding connection axis, and wherein the complementary means for sliding connection are configured to be disengaged in the second configuration and be rotated about a rotation axis to allow for relative rotation of the first and second means for housings away from the sliding plane to provide a third configuration.

There is also disclosed in a second aspect a method of operating an apparatus for a portable electronic device, the apparatus comprising a first housing and a second housing with complementary sliding connectors, wherein the complementary sliding connectors are configured to be engaged along a sliding connection axis such that the first and second housings can be slid with respect to one another between a first configuration and a second configuration along a plane parallel to the sliding connection axis, and wherein the complementary sliding connectors are configured to be disengaged in the second configuration and be rotated around a rotation axis to allow for relative rotation of the first and second housings away from the sliding plane to provide a third configuration, wherein the method comprises operating the first and second housings to provide for the first, second and third configurations of the apparatus There is also disclosed in a third aspect a method of assembling an apparatus for a portable electronic device, the apparatus comprising a first housing and a second housing with complementary sliding connectors, wherein the complementary sliding connectors are configured to be engaged along a sliding connection axis such that the first and second housings can be slid with respect to one another between a first configuration and a second configuration along a plane parallel to the sliding connection axis, and wherein the complementary sliding connectors are configured to be disengaged in the second configuration and be rotated around a rotation axis to allow for relative rotation of the first and second housings away from the sliding plane to provide a third configuration, and wherein the method comprises assembling together the first and second housings to provide for the first, second and third configurations of the apparatus.

There is also disclosed in a forth aspect a computer program for an apparatus for a portable electronic device, the apparatus comprising a first housing and a second housing with complementary sliding connectors, wherein the complementary sliding connectors are configured to be engaged along a sliding connection axis such that the first and second housings can be slid with respect to one another between a first configuration and a second configuration along a plane parallel to the sliding connection axis, and wherein the complementary sliding connectors are configured to be disengaged in the second configuration and be rotated around a rotation axis to allow for relative rotation of the first and second housings away from the sliding plane to provide a third configuration, the computer program comprising computer code to allow automated movement of the apparatus between the first, second and third configurations.

There is also disclosed in a fifth aspect an apparatus for a portable electronic device, the apparatus comprising a first housing and a second housing with complementary sliding connectors,
wherein the second housing sliding connector is configured to extend laterally from a lateral side of the second housing to allow for sliding connection with the complementary sliding connector from the first housing to allow for, when engaged, the first and second housings to be slid with respect to one another between a first configuration and a second configuration along a plane perpendicular to the lateral side, and wherein the complementary sliding connectors are configured to be disengaged in the second configuration to allow for relative rotation of the first and second housings away from the sliding plane to provide a third configuration.

It will be appreciated that this fifth aspect encompasses embodiments wherein the second housing sliding connector is a female connector configured to extend inwardly from a lateral side of the second housing.

There is also disclosed in a sixth aspect an apparatus for a portable electronic device, the apparatus comprising a first housing and a second housing with complementary sliding connectors, the complementary sliding connectors being configured to provide a sliding axis which extends in a plane parallel to opposing first faces of the respective housings to allow for sliding connection such that the first and second housings can be slid with respect to one another between a first configuration and a second configuration along a plane parallel to the opposing first faces, and in the second configuration, the complementary sliding connectors are disengaged to allow for relative rotation of the first and second housings to provide a third configuration in which the opposing first faces of the first and second housings have been rotated away from each other.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

It will be appreciated that for certain embodiments parallel may encompass both axes or planes which have the same orientation but offset, and axes or planes which have the same orientation and overlap.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

For the sake of convenience, different embodiments depicted in the figures have been provided with reference numerals that correspond to similar features of earlier described embodiments. For example, feature number 1 can also correspond to numbers 101, 201, 301 etc. These numbered features but may not have been directly referred to within the description of these particular embodiments. These have still been provided in the figures to aid understanding of the further embodiments, particularly in relation to the features of similar earlier described embodiments.

Figure 1:
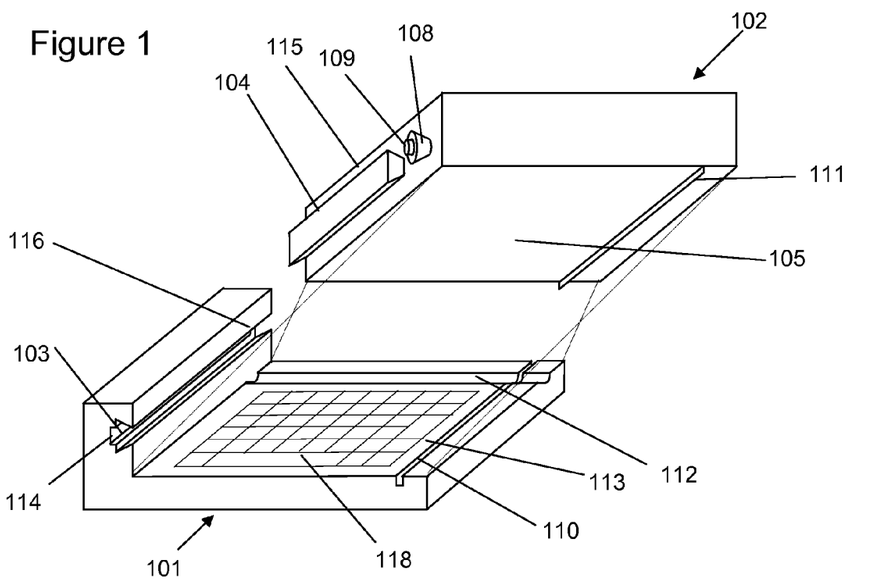
FIG. 1 shows an embodiment showing the first housing separated from the second housing for clarity.

FIG. 1 shows an embodiment which is an electronic device with a first housing (101) and a second housing (102), wherein the first housing and second housings have been separated (e.g. pre-assembly). The first housing (101) comprises a first face (113) which, in this embodiment, is a major face. A keyboard (e.g. or display, or track interface) (118) lies on the first face (113). The first housing (101) comprises a second face (116) into which extends a first housing (female) sliding connector (103). In this embodiment the second face (116), on which the first housing sliding connector (103) is shaped, faces inwardly towards the first face. Inwardly means that there are line-segments which can be drawn normal to the first and second faces and away from the bulk of the housing, such that the line segments converge. FIG. 1 further shows a second housing (102) which comprises a first face (105) and a second face (115) shaped to complement/correspond with to the first face (113) and second face (116) of the first housing (101). The second housing comprises a (male) sliding connector (104) shaped so as to be complementary to the first housing sliding connector (103).

This embodiment further comprises complementary guide rails (110, 111) which are configured to allow the second housing to slide along an axis parallel to the complementary sliding connectors. In this case the second housing guide rail (111) protrudes and the first housing guide rail (110) is recessed, although in other embodiments this could be reversed.

This embodiment further comprises a rotation recess (112) which permits rotation of the second housing with respect to the first housing (as explained later).

It will be appreciated that other embodiments (not shown) may comprise a second similar/different sliding/rotating connection mechanism on the faces opposite to the second faces of the first and second housings, e.g. the apparatus could have the same arrangement on the right hand as well as the left hand side of FIG. 1. The sliding connectors of the first housing may be either both male or both female, or may comprise one male sliding connector on one side and one female sliding connector on the opposite side (the second housing having complementary sliding connectors in each case).

The cross-section (e.g. see FIG. 2) of the sliding connectors may be substantially similar along their length, along the sliding connection axis. The cross-sections are taken in a plane perpendicular to the sliding axis (106, FIG. 3). The complementary sliding connectors may or may not be the same length.

Figure 2A:
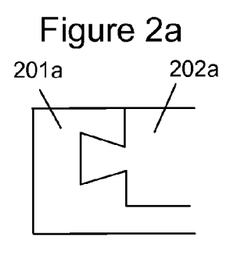
FIGS. 2a, 2b, 2c, 2d and 2e show a number of sliding connector cross-sections.

FIG. 2a shows a cross-section of the complementary sliding connectors similar to the embodiment of FIG. 1. The sliding connector of the second housing (202a) is male, and the sliding connector of the first housing (201a) is female in this embodiment (as in FIG. 1).

Figure 2B:
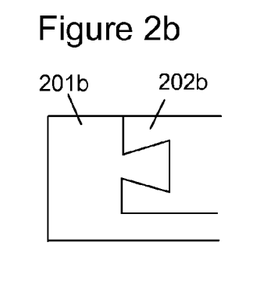

FIG. 2b shows a cross-section of different complementary sliding connectors. In this case, the sliding connector of the second housing (202b) is female (rather than male as in FIG. 2a), and the sliding connector of the first housing (201b) is male.

Figure 2C:
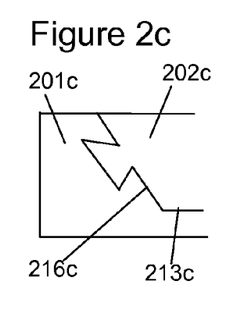

FIG. 2c shows a further cross-section of complementary sliding connectors. In contrast to FIGS. 1 and 2b, the second face (216c) of the first housing is not perpendicular to the first face (213c).

Figure 2D:
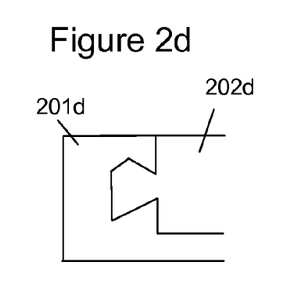

FIG. 2d shows another cross-section of complementary sliding connectors. Unlike the embodiment of FIGS. 2a and 2b, the sliding connectors are shaped such that they are not symmetric in any plane parallel to the sliding connection axis.

Figure 2E:
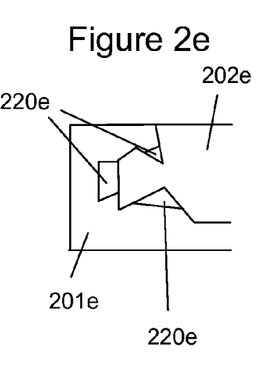

FIG. 2e shows a further cross-section of complementary sliding connectors. This is similar to the embodiment of FIG. 2d but the female complementary sliding connector is configured to match the shape of the male complementary sliding connector only on a portion of the surface. This results in gaps (220e) between the complementary sliding connectors.

A person skilled in the art will appreciate that FIG. 2 gives a number of examples of sliding connectors, but that these examples are not exhaustive (e.g. L-shaped male sliding connectors could be used). Some designs of sliding connectors may be considered to be a dovetail joint. A dovetail joint may have a trapezium-shaped cross section with two parallel sides.

Figure 3A:
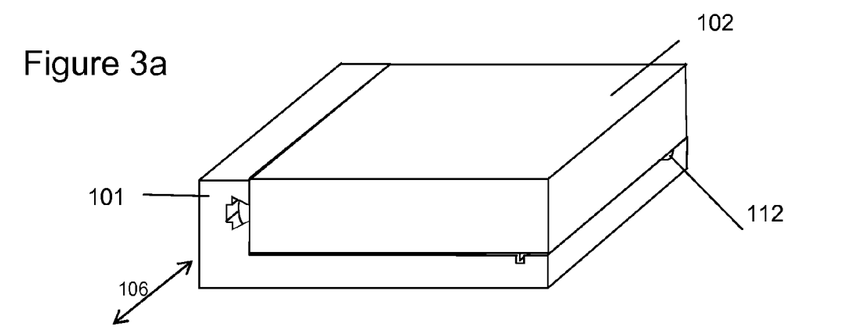
FIGS. 3a, 3b and 3c shows the embodiment of FIG. 1 wherein the first and second housings are configured to be in the first configuration.
Figure 3B:
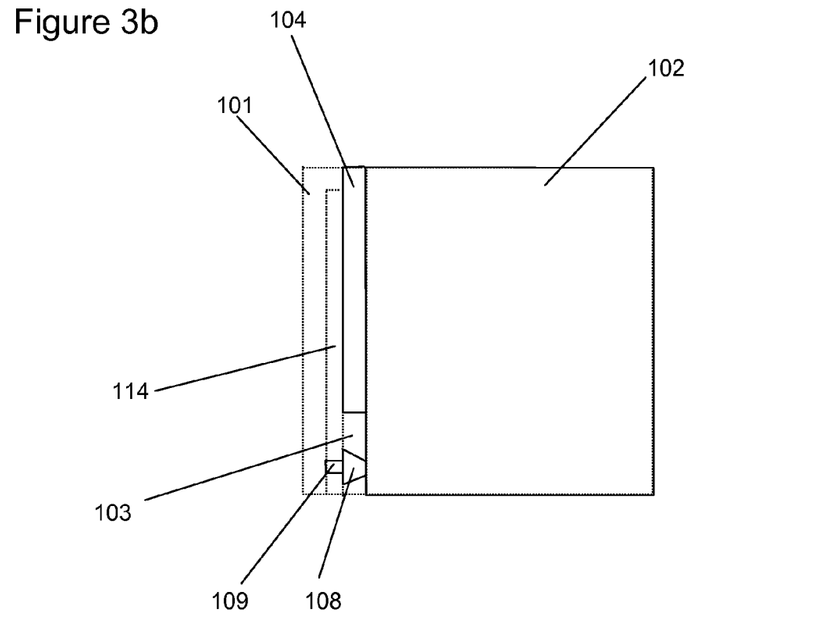
Figure 3C:
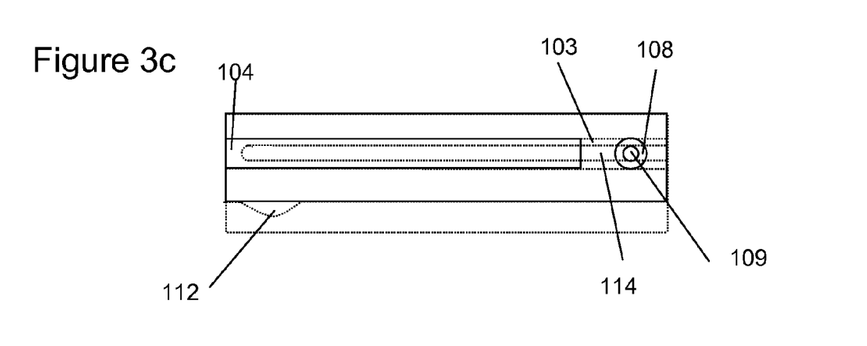

FIGS. 3a, 3b and 3c show the embodiment of FIG. 1 where the first housing (101) is attached to the second housing (102). The first (101) and second (102) housings are configured to be in a first configuration. In this first configuration the complementary sliding connectors (103, 104) are engaged. In this particular configuration and for this embodiment, the first (113, 105) and second (116,115) faces of the first (101) and second (102) housings overlap. The area of overlap gives the size of the surface area common to the overlapping faces. In this configuration the keyboard (118) is concealed. The second housing (102) houses a screen (119) which is situated on the face reverse to the first face (105) of the second housing (102). In other embodiments (not shown) complementary faces, if present, may only partially overlap in the first configuration.

FIGS. 3b and 3c show views of the configuration shown in FIG. 3a from the top and side respectively. Features of the first housing (101) are shown in dotted lines for clarity. In this embodiment the sliding connector (103) of the first housing extends along the entire second face of the first housing. In other embodiments the sliding connector of the first housing may only extend partially along a face. The complementary sliding connector of the second housing (104) is configured to extend partially along the complementary second face of the second housing.

The second housing comprises a rotating member (108, 109). Because in the first configuration the second housing may only move with respect to the second housing along the sliding connector axis (106), the rotating member is not free to rotate in the first configuration. In this embodiment a first portion (108) of the rotating member is shaped to have the same cross-section (taken through the centre of the rotating member) as the male sliding connector (104). In the configuration shown, this portion (108) is housed within the complementary sliding connector (103) of the first housing (101). The rotating member has a second portion (109) which gives the rotating member a larger cross-section than the male sliding connector (104). This second portion (109) is housed in a complementary channel (114) embedded in the female connector (103). This complementary channel does not extend as far along the sliding connection axis as the female complementary connector. This complementary channel (114) allows the second portion (109), and therefore the rotating member, to slide only a limited amount along the sliding connection axis (106).

Other embodiments may not have this second portion (109). However, it will be appreciated that other embodiments may have a member distinct from the rotating member to limit the motion of the first housing from the shown first configuration.

Figure 4A:
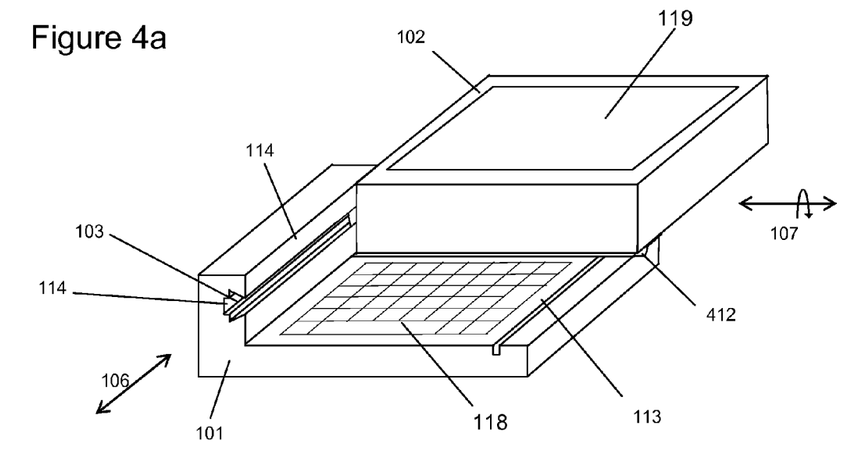
FIGS. 4a, 4b and 4c shows the embodiment of FIG. 3 wherein the first and second housings are configured to be in the second configuration.

The complementary connectors (103, 104) are such that they permit a sliding motion of the first and second housings along a single sliding connection axis (106) between the shown first and a second configuration (e.g., FIG. 4a). In this embodiment the sliding connection axis is straight. Also in this particular embodiment it will be appreciated that the connectors are configured to prevent motion of the first housing with respect to the second housing which is not along the sliding connection axis.

Figure 4B:
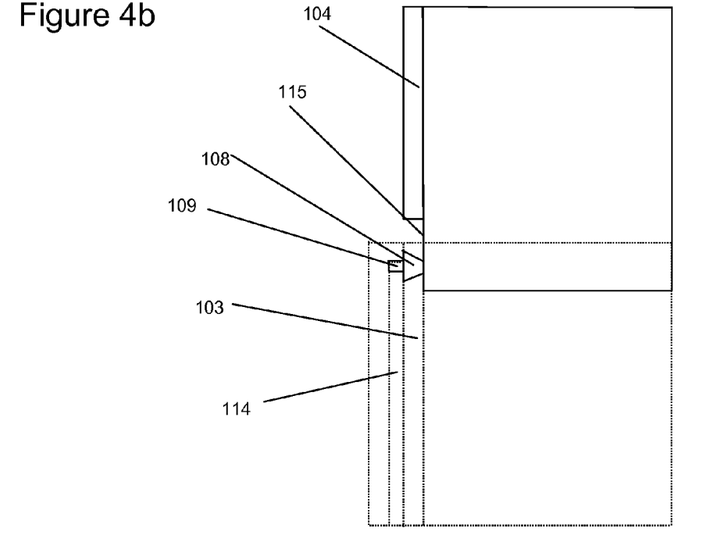
Figure 4C:
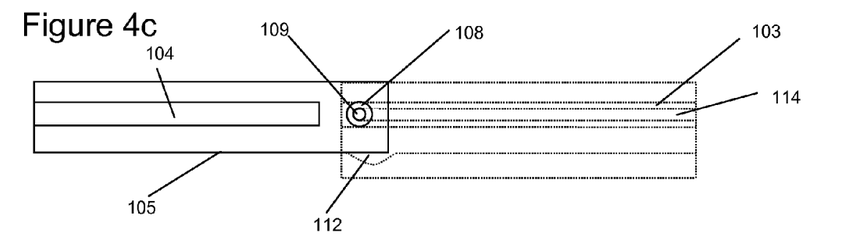

FIGS. 4a, 4b and 4c show the embodiment of FIG. 3a wherein the second housing (102) has been slid to a second configuration wherein the male sliding connector (104) has disengaged from the female sliding connector (103) There will of course be intermediate (or other second) configurations in which the male/female connectors are not disengaged. When sliding the second housing between the first and second configurations, the guide rails (110,111) may mitigate a shearing force being concentrated on the sliding connectors if, for example, a force is exerted on the housings not along the sliding connection axis.

FIG. 4b shows that the second housing could not be slid further along the sliding connection axis (106) as the second portion (109) of the rotating member has reached the furthest extent of the complementary channel (114) in that direction.

In the configuration of FIGS. 4a, 4b and 4c, the first and second faces (113,116) of the first housing (101) still partially overlap the complementary first (105) and complementary second (115) faces of the second housing (102). As the section of the second housing (102) which overlaps the first housing (101) is not rotationally symmetric about the rotation axis, a rotation recess (112) in the first face (113) of the first housing (101) allows the second housing (102) to rotate with respect to the first housing (101).

It will be appreciated that in this embodiment, the first face (113) of the first housing (101) and the complementary first face (105) of the second housing (102) lie in a plane parallel to the sliding connection axis (106) and the rotation axis (107) when the apparatus is in the first and second configurations (FIGS. 3, and 4). In this embodiment, it will be appreciated that the second face (116) of the first housing (101) and the complementary second face (115) of the second housing (102) are perpendicular to the rotation axis. In addition, the first face (113) of the first housing (101) is perpendicular to the second face (416) of the first housing (101). Furthermore, the second face (115) of the second housing (102) may be considered to be a lateral side of the second housing (102) as it is at the side of a major face (105).

In this particular "second" configuration the rotating member (108, 109) is free to rotate. As will be further explained with reference to FIGS. 5a, 5b and 5c, the apparatus in this embodiment is also configured to have a rotation axis (107) about which the second housing (102) may rotate with respect to the first housing (101) which is perpendicular to the sliding connection axis (106).

Figure 5A:
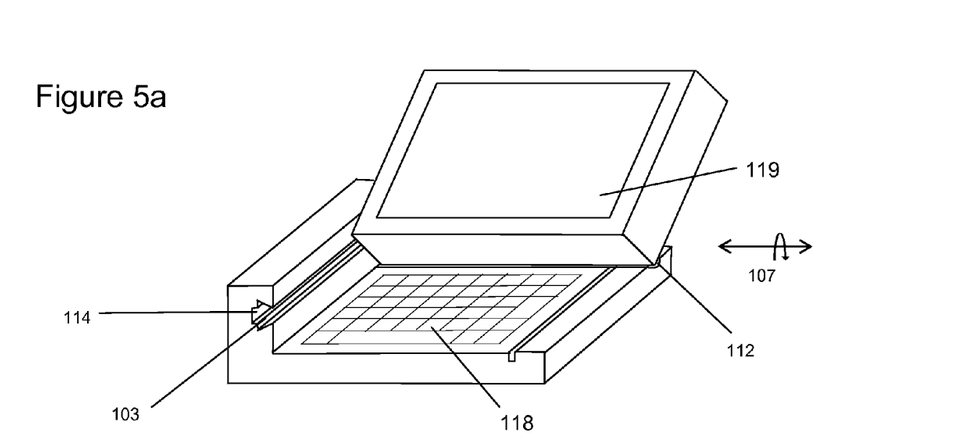
FIGS. 5a, 5b and 5c shows the embodiment of FIG. 3 wherein the first and second housings are configured to be in a third configuration.
Figure 5B:
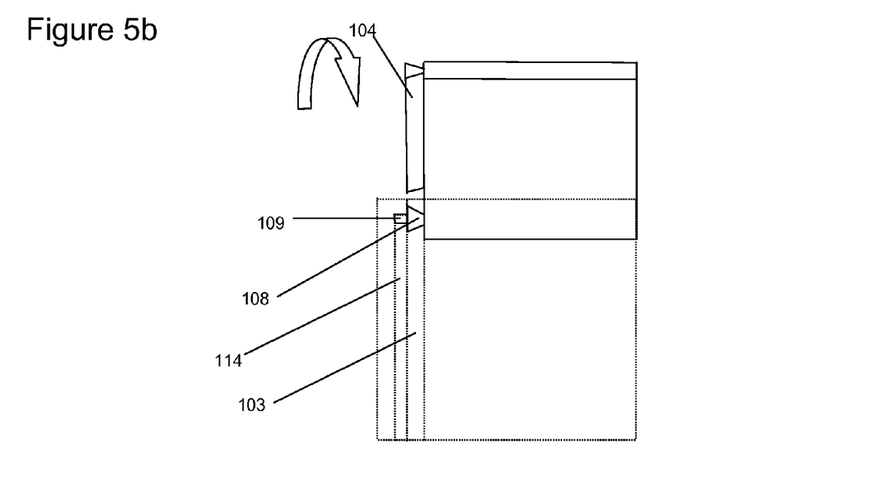
Figure 5C:
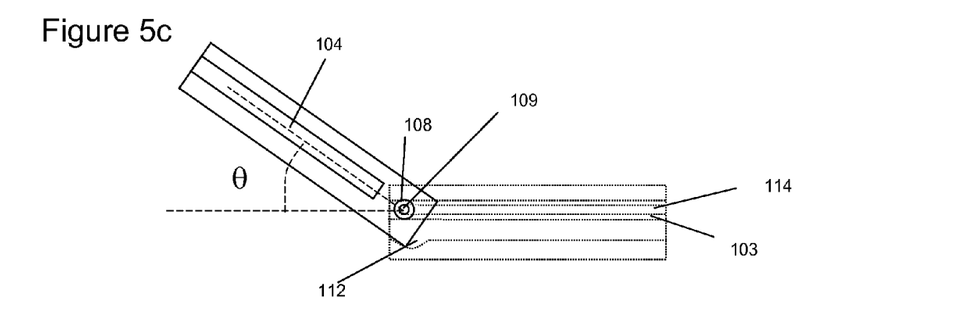

FIGS. 5a, 5b and 5c show a configuration in which the second housing has been rotated about the rotation axis into a third rotated configuration. In this embodiment, the maximum angle of rotation, $\theta_{max}$, is determined by the shape of the first and second housings, and more specifically by the shape of the rotation recess (112) in the first housing. This can be seen in FIG. 5c, as the second housing (102) can only be rotated until the corner of the second housing in the recess (112) comes into contact with the bottom surface of the recess (112). The second housing may not be rotated beyond this, with respect to the first housing.

In this particular embodiment it will be appreciated that for the second and third configurations the rotating member is configured to prevent motion of the first housing (101), with respect to the second housing (102), which is not rotation about the rotation axis (107). Some designs of rotating member may be considered to be a barrel or pivot hinge.

Figure 6A:
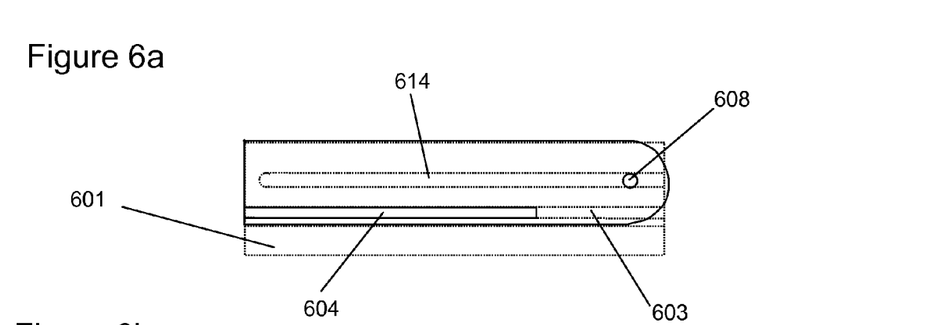
FIGS. 6a, 6b, 6c and 6d shows an embodiment wherein the first housing is shaped to allow free rotation about the rotation axis in the third configuration, and the rotating member moves on an axis which lies parallel to the female sliding connector.

FIG. 6a depicts another embodiment in the previously mentioned first configuration. Whereas in the embodiment of FIG. 3 where, in the first configuration, the rotating member (108) lies in the first housing sliding connector (103), in this embodiment the rotating member (608) is housed in a complementary channel (614) which is parallel to, but laterally offset from, the sliding axis (606).

Figure 6B:
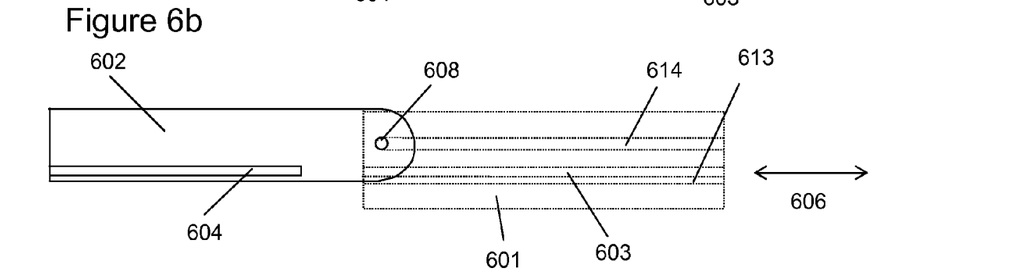

FIG. 6b shows the embodiment of FIG. 6a, wherein the second housing (602) has been slid along the sliding axis (606) with respect to the first housing (601) to the previously mentioned second configuration. Unlike the embodiment shown in FIG. 3, the embodiment of FIG. 6 does not have a feature corresponding to the rotation recess (112). In this embodiment the surface of the second housing (602) has been shaped so that a portion of the surface is equidistant from the rotation axis. This allows the second housing (602) to be rotated with respect to the first housing (601).

Figure 6C:
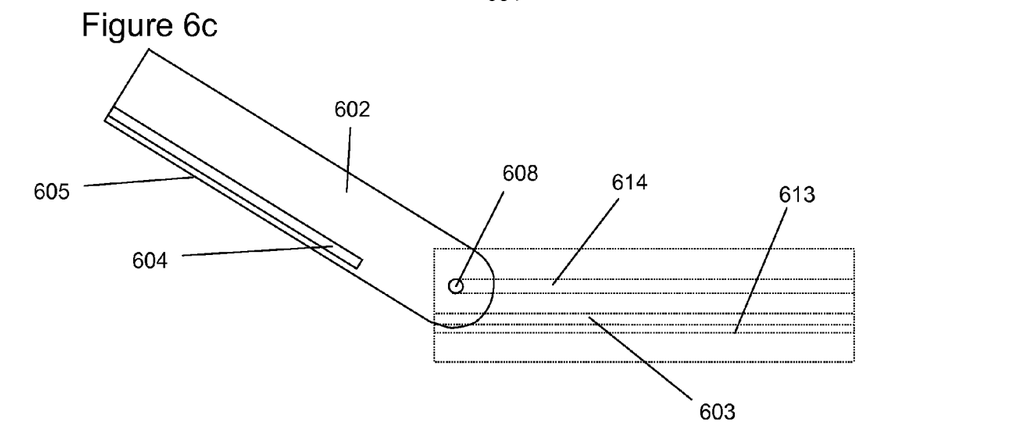

FIG. 6c illustrates the embodiment of FIG. 6a in a third configuration.

Figure 6D:
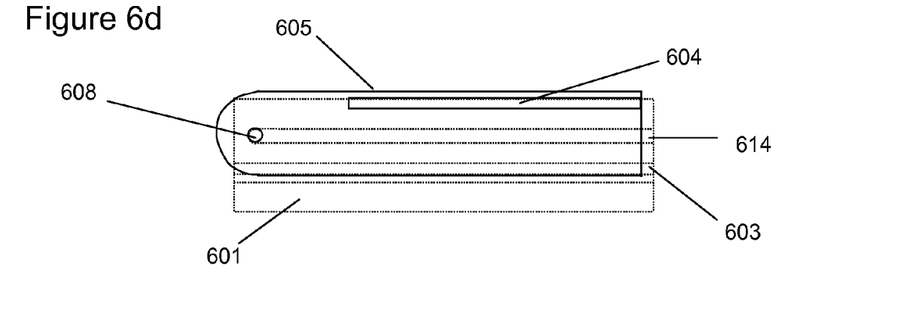

FIG. 6d illustrates the embodiment of FIG. 6a in another third configuration. As the rotation member in this embodiment has been offset from the sliding connectors, the second housing (602) can be rotated by 180° with respect to the first housing (601), without the male sliding connector (604) impinging on the first housing (601). In this configuration the second housing has been inverted compared to its position in the first configuration. This can be seen in FIG. 6d as the first face (605) of the second housing (602) is shown to be opposite to the face overlapping the first face of the first housing (601) in this configuration; however in the first configuration (shown in FIG. 6a) the first face (605) of the second housing (602) overlaps the first face (613) of the first housing (601).

In this embodiment, like the embodiment of FIG. 3, the rotation axis is perpendicular to the sliding axis. It will be appreciated that other embodiments may have a rotation axis which is not perpendicular to the sliding axis (not shown).

Figure 7A:
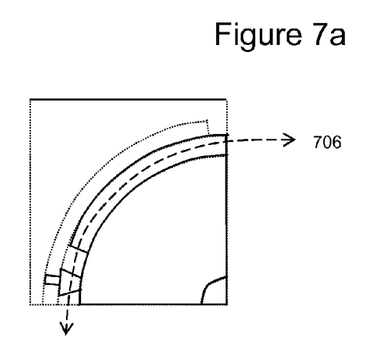
FIGS. 7a, 7b (plan view) and 7c (perspective view) shows an embodiment wherein the sliding axis is curved.
Figure 7B:
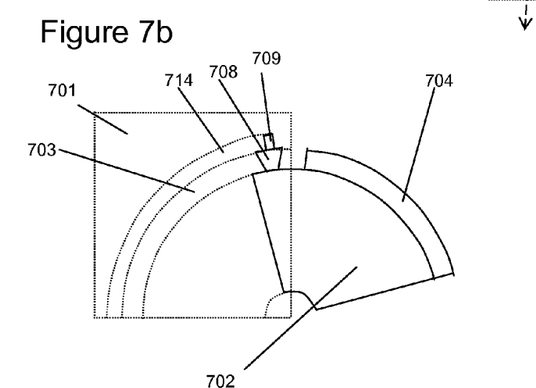
Figure 7C:
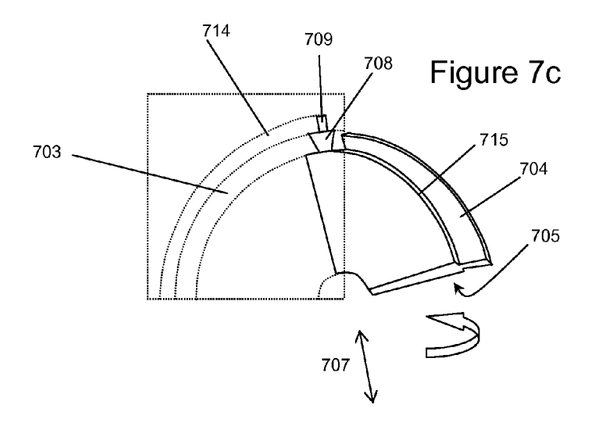

FIGS. 7a, 7b and 7c shows an embodiment in the previously mentioned first, second and third configurations respectively. In this embodiment the sliding axis (706) is curved. In this embodiment the rotation axis (707) is perpendicular to the sliding axis in the second configuration. In this embodiment the complementary second face (715) of the second housing may be considered to be a lateral side of the second housing as it is at the side of a major face (705). In this embodiment the lateral side is a curved face.

It will be appreciated that the first and second housings may contain electronic equipment. In the embodiment of FIG. 3, where the first housing (101) houses a keyboard (118) and the second housing (102) houses a screen/display/track interface (119), there may be electrical connection provided between the two housings.

Figure 8:
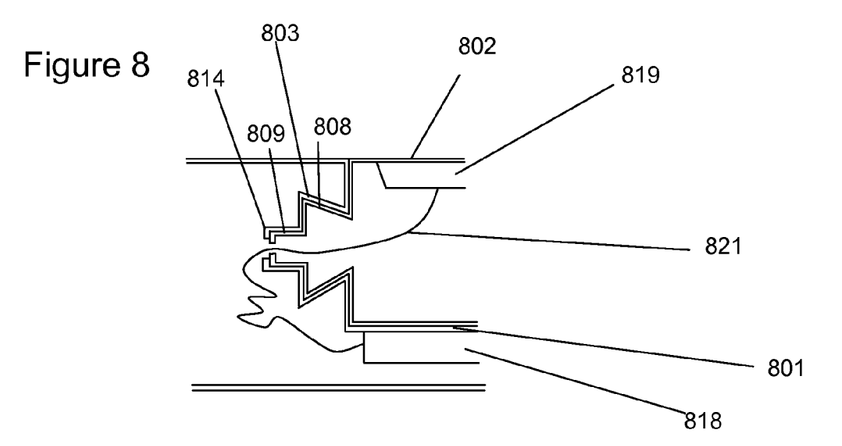
FIG. 8 shows a cross-section through the rotating member of an embodiment wherein an electrical cable passes though the rotating member.

FIG. 8 depicts an embodiment for providing electrical connection between the first and second housings. In this embodiment an electrical cable (821) connects the screen (819) of the second housing (802) to the keyboard (818) of the first housing (801). The cable (821) is passed through a hole in the centre of the rotating member (809) and through a corresponding slit in the channel (814).

Figure 9:
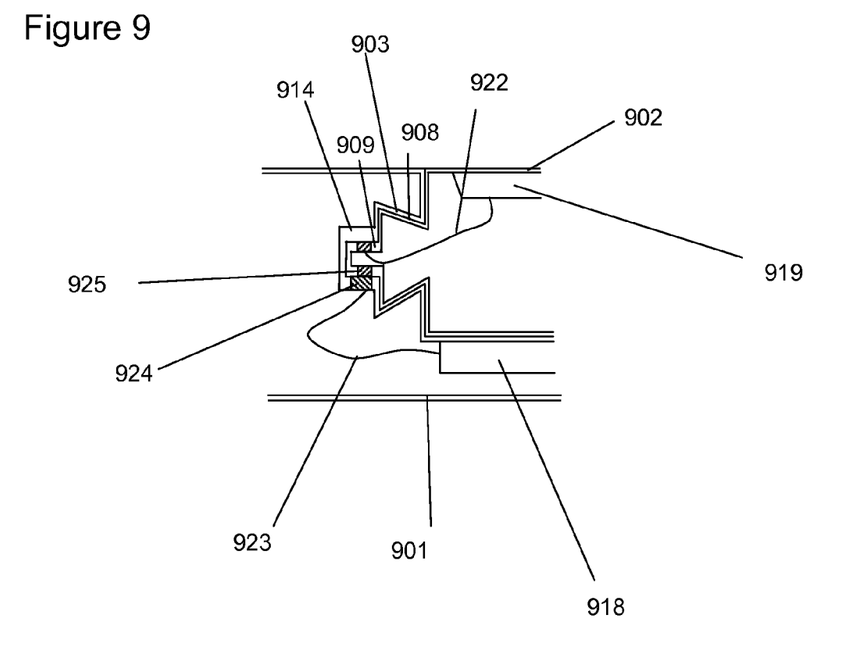
FIG. 9 shows a cross-section through the rotating member of an embodiment wherein electrical and data connection between the first and second housings is provided by electrical contacts embedded in the rotating member an the corresponding channel.

FIG. 9 depicts a further embodiment suitable for providing electrical connection between the first and second housings. Unlike the embodiment of FIG. 8 which has an uninterrupted cable (821) connecting the screen (819) to the keyboard (818), this embodiment has two cables. A first cable (923) connects the keyboard (918) to a first electrical contact (924) embedded in the wall of the complementary channel (914). This first electrical contact (924) is configured to be in contact electrical connection with a second electrical contact (925) embedded in the rotating member (909). The first electrical contact (924) may be embedded along a length of the channel (914) so to provide electrical connection in multiple configurations or the electrical contact may only be provided in a selection of positions only. It will be appreciated that some embodiments may not necessarily provide both electric and data connection for the same configurations. The second electrical contact may be embedded around a portion of the surface of the rotating member (909), so as to permit electrical connection in a number of different configurations of the apparatus. The second electrical contact is connected to the screen (919) via a second cable (922). If, for example, the device was dropped the first housing may be separated from the second housing without breaking the electrical cables (922, 923) or applying unnecessary force to electrical components via the electrical cables (922, 923).

Figure 10A:
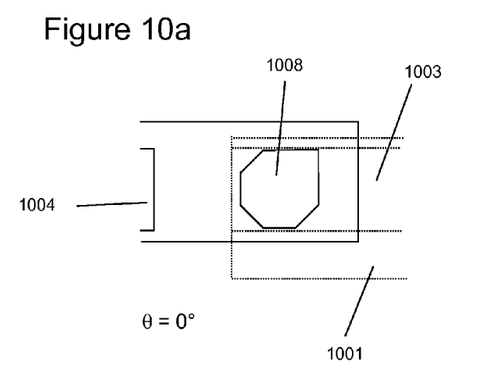
FIGS. 10a-10d shows an embodiment comprising a shaped resilient rotating member in various configurations.
Figure 10B:
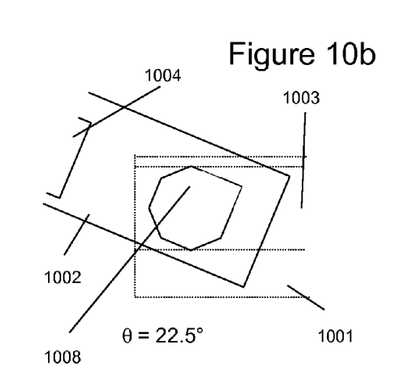
Figure 10C:
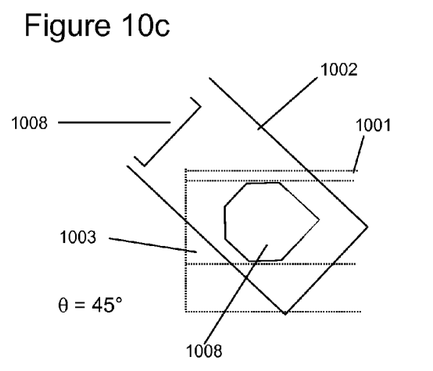
Figure 10D:
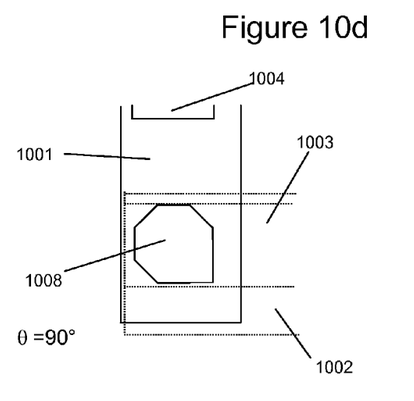

In the embodiment of FIG. 1, the rotating member (108, 109) is depicted as being substantially rotationally symmetric. FIG. 10a, however, depicts an embodiment which includes a resilient rotation member (1008) which is not rotationally symmetric. FIGS. 10a-10d show a range of different configurations of the apparatus. When the apparatus is in the second configuration (FIG. 10a), the cross-section of the rotating member (1008), taken at a plane centered on the rotation axis and perpendicular to the sliding axis, is readily housed within the sliding connector (1003). Upon rotation by $\theta=22.5°$ the cross-section of the rotating member (1008) has increased. As the rotation member (1008) flexes to be accommodated in the sliding connector (1003), a force is established making this configuration less stable than the configuration depicted in FIG. 10a. Upon further rotation to $\theta=45°$ (FIG. 10c) the cross-section of the rotational member is the same as it was in FIG. 10a. In this configuration the force acting on the housings from the contact between the resilient rotating member (1008) and the sliding connector (1003) is the same as the force acting on the housing in the configuration depicted in FIG. 10a. Likewise in FIG. 10d, as the cross-section of the rotating member is the same for $\theta=90°$ as for θ=0 and 45° the force on the first and second housings are the same as for these configurations. However, on further rotation of the second housing (1002) with respect to the first housing (1001) beyond θ=90°, the force increases rapidly. This increase is because the rotating member (1008) is shaped such that the cross-section increases significantly on rotation beyond θ=90°. In this embodiment this prevents the first housing being rotated beyond θ=~110°.

Figure 10E:
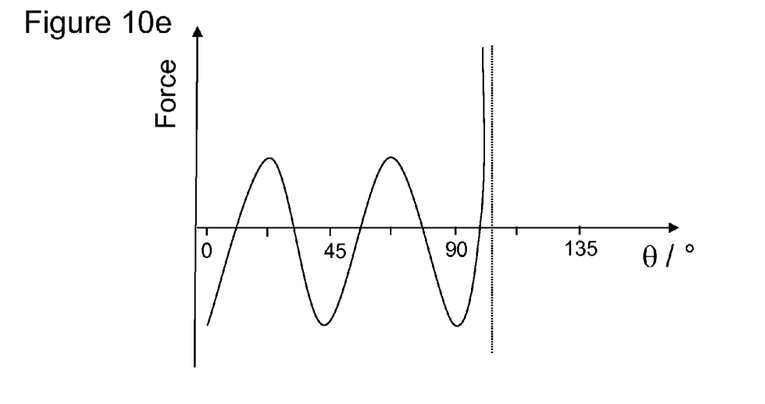
FIG. 10e shows the force exerted by the resilient connector as a function of rotation angle, $\theta$.

FIG. 10*e* depicts the force exerted on the first housing by the second housing through the interaction of the female sliding connector (1003) and the rotating member (1008), as a function of θ. This graph illustrates that there are a number of particularly stable configurations of the device (θ=0, 45 and 90°). It will be appreciated that shaping the resilient rotating member differently will result in the force varying differently as a function of angle. In addition, it will be appreciated that an embodiment comprising a non-resilient rotating member and a resilient female sliding connector or comprising a resilient rotating member and a resilient female sliding connector may exhibit similar characteristics.

Figure 11:
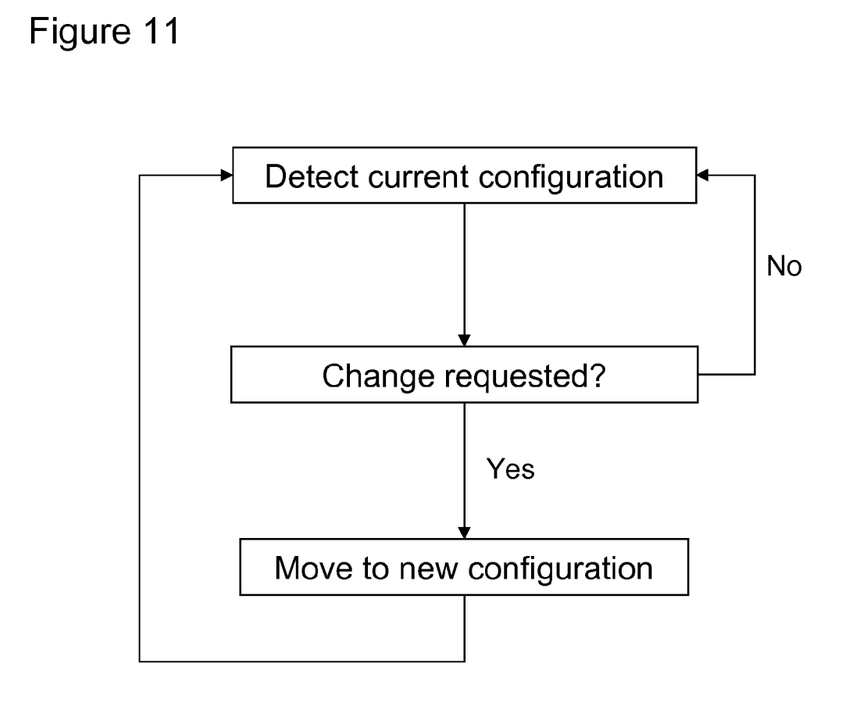
FIG. 11 shows a flow diagram for a computer program.

FIG. 11 illustrates the processing of a computer program configured to monitor and change the configuration of the apparatus. The computer program is configured to read configuration signalling corresponding to the configuration of the device. Command signalling may also be input into the programme. Command signalling may originate from an automatic programmed list of commands, or from a user via an interface. Command signalling may comprise signals requesting a desired configuration to be adopted by the apparatus or a series of movements to be performed. Using the command signalling and the configuration signalling the computer program determines whether the apparatus is in the desired configuration. If the apparatus is not already in the desired configuration, the program outputs instructions to deliver signalling to, for example, motors in order to move the device to the desired configuration. If the apparatus is already in the desired configuration the program resumes reading the configuration signalling, and waits for command signalling input.

Figure 12:
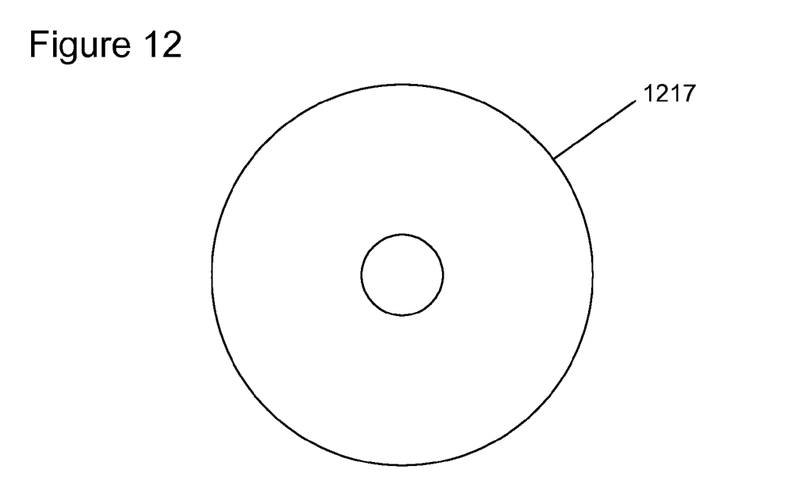
FIG. 12 illustrates schematically a computer readable media providing a program according to an embodiment of the present invention.

FIG. 12 illustrates schematically a computer/processor readable media (1217) providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function. The computer program may be recorded on a recording medium.

It will be appreciated that there may be an embodiment of which there is a configuration wherein the first housing is first required to be pushed onto a rail or sliding connector of the second housing to enable the first housing to slide with respect to the second housing. Alternatively/additionally, a catch/release mechanism (not described) may be required to initiate the movement.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus for a portable electronic device, the apparatus comprising:
   a first housing; and
   a second housing with complementary sliding connectors,
      wherein the complementary sliding connectors are configured to be engaged along a sliding connection axis such that the first and second housings can be slid with respect to one another between a first configuration and a second configuration along a plane parallel to the sliding connection axis,
      wherein the complementary sliding connectors are configured to be disengaged in the second configuration and be rotated about a rotation axis to allow for relative rotation of the first and second housings away from the sliding plane to provide a third configuration, and
      wherein the complementary sliding connectors provide a complementary dovetail joint in which a female complementary sliding connector is configured to match a shape of a male complementary sliding connector on only one side of surfaces engaged along the sliding connection axis to define one or more gaps between the female complementary sliding connector and the male complementary sliding connector, and
      wherein the sliding connection axis is perpendicular to the rotation axis.

2. An apparatus according to claim 1, wherein the sliding connection axis extends along a lateral side of the second housing.

3. An apparatus according to claim 1, wherein the first and/or second housing comprises a male dovetail joint and the other of the first or second housing comprises a female dovetail joint.

4. An apparatus according to claim 1, wherein the first and/or second housing comprises a rotating member configured to provide for connection and rotation of the housings from the second configuration to the third configuration.

5. An apparatus according to claim 4, wherein the rotating member is configured to move along an axis parallel to the sliding connection axis when the first housing is slid with respect to the second housing between the first and second configurations.

6. An apparatus according to claim 4, wherein the rotating member is configured to slide within an opposing complementary sliding connector during sliding between the first configuration and the second configuration.

7. An apparatus according to claim 4, wherein the rotating member is configured to rotate within an opposing complementary sliding connector during rotation between the second configuration and the third configuration.

8. An apparatus according to claim 4, wherein the rotating member comprises a barrel hinge.

9. An apparatus according to claim 4, wherein the rotating member and an opposing complementary sliding connector are configured to prevent the first housing sliding beyond the second configuration.

10. An apparatus according to claim 4, wherein the apparatus is configured such to provide resistance to the rotation of the second housing with respect to the first housing in the third configuration such that the apparatus is stable in multiple third configurations with different angles being defined between the first and second housings.

11. An apparatus according to claim 10, wherein the resistance is provided by the rotating member and/or the opposing complementary sliding connector.

12. An apparatus according to claim 1, wherein the first and second housings comprise opposing faces which overlap in the first configuration and overlap in the second configuration, wherein the second configuration area of overlap in is less than the first configuration area of overlap.

13. An apparatus according to claim 12, wherein the first and second faces comprise complementary guide members configured to facilitate guiding of the housings between the first and second configurations.

14. An apparatus according to claim 12, wherein a user interface on the first and/or second housing(s) is/are revealed by sliding movement between the first and second configurations.

15. An apparatus according to claim 12, wherein the one of the first and/or second housing comprises a rotation recess configured to facilitate housing rotation between the second configuration and the third configuration.

16. An apparatus of claim 1, wherein the sliding connector connection axis is straight and/or curved.

17. An apparatus according to claim 1 where the sliding connector of the second housing is located at only one lateral side of the second housing.

18. An apparatus according to claim 1 where the apparatus is configured such that the complementary sliding connectors need to be disengaged before the first and second housings can be moved to the third configuration.

19. An apparatus according to claim 1 where the sliding connector of the first housing is provided along an entire length of a first side of the first housing, and where the sliding connector of the second housing is provided along a majority of a length of a first side of the second housing which is less than a full length of the first side of the second housing.

20. An apparatus for a portable electronic device, the apparatus comprising:
   a first housing and
   a second housing with complementary sliding connectors,
      wherein the second housing sliding connector is configured to extend laterally from a lateral side of the second housing to allow for sliding connection with the complementary sliding connector from the first housing to allow for, when engaged, the first and second housings to be slid with respect to one another between a first configuration and a second configuration along a plane perpendicular to the lateral side,
      wherein the complementary sliding connectors are configured to be disengaged in the second configuration to allow for relative rotation of the first and second housings away from the sliding plane to provide a third configuration; and
      wherein the complementary sliding connectors provide a complementary dovetail joint in which a female complementary sliding connector is configured to match a shape of a male complementary sliding connector on only one side of surfaces engaged along the sliding connection axis to define one or more gaps between the female complementary sliding connector and the male complementary sliding connector, and
wherein the sliding connector is perpendicular to an axis that allows for the relative rotation of the first and second housings.

21. An apparatus of claim 20 wherein the female complementary sliding connector is configured to extend inwardly from a lateral side of the second housing.

22. An apparatus for a portable electronic device, the apparatus comprising:
a first housing; and
a second housing with complementary sliding connectors, wherein the complementary sliding connectors being configured to provide a sliding axis, which extends in a plane parallel to opposing first faces of the respective housings, the complementary sliding connectors being further configured to allow for sliding connection such that the first and second housings can be slid with respect to one another between a first configuration and a second configuration along a plane parallel to the opposing first faces, and in the second configuration, the complementary sliding connectors are disengaged such that the apparatus is configured to allow for relative rotation of the first and second housings to provide a third configuration in which the opposing first faces of the first and second housings have been rotated away from each other,
wherein the complementary sliding connectors provide a complementary dovetail joint in which a female complementary sliding connector is configured to match a shape of a male complementary sliding connector on only one side of surfaces engaged along the sliding connection axis to define one or more gaps between the female complementary sliding connector and the male complementary sliding connector, and
wherein the sliding axis is perpendicular to an axis that allows for the relative rotation of the first and second housings.

* * * * *